(12) United States Patent
Pachon et al.

(10) Patent No.: US 11,093,891 B1
(45) Date of Patent: Aug. 17, 2021

(54) DYNAMICALLY GENERATING A SORT ZONE ASSIGNMENT PLAN

(71) Applicant: Amazon Technologies, Inc., Seattle, WA (US)

(72) Inventors: Julian Enrique Pachon, Austin, TX (US); Marc Joseph Anderson, Austin, TX (US); Howard Preston Smith, II, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 385 days.

(21) Appl. No.: 16/052,987

(22) Filed: Aug. 2, 2018

(51) Int. Cl.
   G06Q 10/08 (2012.01)
(52) U.S. Cl.
   CPC ................ G06Q 10/0833 (2013.01)
(58) Field of Classification Search
   CPC .................................................. G06Q 10/0833
   See application file for complete search history.

(56) References Cited

U.S. PATENT DOCUMENTS

| | | | | |
|---|---|---|---|---|
| 5,063,506 A | * | 11/1991 | Brockwell | G06Q 10/06315 705/7.37 |
| 6,974,928 B2 | * | 12/2005 | Bloom | G07C 9/23 209/583 |
| 7,118,034 B2 | * | 10/2006 | Baldassari | B07C 3/10 235/383 |
| 7,306,147 B2 | * | 12/2007 | Baldassari | B07C 3/10 235/384 |
| 7,357,317 B2 | * | 4/2008 | Baldassari | B07C 3/10 235/383 |
| 7,516,889 B2 | * | 4/2009 | Baldassari | B07C 3/10 235/383 |
| 7,653,457 B2 | * | 1/2010 | Bloom | G07C 9/23 700/226 |
| 7,686,171 B1 | * | 3/2010 | Shakes | B07C 7/005 209/630 |
| 7,689,465 B1 | * | 3/2010 | Shakes | G06K 9/78 705/27.1 |
| 7,984,809 B1 | * | 7/2011 | Ramey | B65G 1/137 209/546 |
| 8,110,052 B2 | * | 2/2012 | Olsen | B07C 7/005 156/64 |

(Continued)

OTHER PUBLICATIONS

Gao, Hui, Wang, Xuping, Chai, Xiukun, and Liu, Hongtao, "Optimization of Sorting Systems in Destination Distribution Centers of Business-to-Consumer Courier Companies," International Journal of Electronic Commerce Studies, vol. 5, No. 2, 2014, pp. 143-160.*

*Primary Examiner* — Nathan Erb
(74) *Attorney, Agent, or Firm* — Thomas | Horstemeyer, LLP

(57) ABSTRACT

Disclosed are various embodiments for generating a sort zone assignment plan for packages expected to arrive at a facility during a predetermined period of time. Prior to arrival of the packages at the facility, a sort zone assignment plan is generated that optimizes distribution of the plurality of packages to a plurality of sort zones within the facility for a given sorting cycle. Once a package arrives at the facility, the package is scanned and the sort zone assignment is determined according to the sort zone assignment plan. The package is then transferred to the assigned sort zone.

20 Claims, 7 Drawing Sheets

(56) References Cited

U.S. PATENT DOCUMENTS

| | | | | |
|---|---|---|---|---|
| 8,234,006 B1* | 7/2012 | Sachar | ............... | G06Q 10/087 700/216 |
| 8,457,781 B2* | 6/2013 | Bailey | ................... | G06Q 50/28 700/224 |
| 8,489,228 B2* | 7/2013 | Christ | ................. | G06Q 10/047 700/214 |
| 8,815,031 B2* | 8/2014 | Olsen | .................... | B07C 7/005 156/64 |
| 8,851,827 B2* | 10/2014 | Burgstaller | .......... | B65G 1/1378 414/807 |
| 8,952,284 B1* | 2/2015 | Wong | ..................... | G05B 15/02 209/586 |
| 9,020,634 B2* | 4/2015 | Bailey | ................... | G06Q 50/28 700/224 |
| 9,162,257 B2* | 10/2015 | Schulz | ..................... | B07C 3/00 |
| 9,336,509 B1* | 5/2016 | Arun Singhal | ...... | G06Q 10/087 |
| 9,809,384 B2* | 11/2017 | Mountz | ............... | B65G 1/1378 |
| 10,217,075 B1* | 2/2019 | Ward | ................. | G06Q 30/0639 |
| 10,242,333 B1* | 3/2019 | Colucci, III | ........ | G06Q 10/083 |
| 10,259,650 B2* | 4/2019 | Mountz | ................. | B65G 1/137 |
| 10,589,656 B2* | 3/2020 | Taylor | .................. | B60P 3/0257 |
| 10,596,602 B2* | 3/2020 | Chen | ................... | B07C 5/3412 |
| 2002/0178074 A1* | 11/2002 | Bloom | .................. | G06Q 10/08 705/26.81 |
| 2004/0004119 A1* | 1/2004 | Baldassari | ............ | G06Q 10/08 235/384 |
| 2005/0252596 A1* | 11/2005 | Olsen | ..................... | B07C 7/005 156/64 |
| 2006/0273167 A1* | 12/2006 | Baldassari | ............ | G06K 17/00 235/385 |
| 2007/0000990 A1* | 1/2007 | Baldassari | ............ | G06Q 50/30 235/375 |
| 2007/0012602 A1* | 1/2007 | Baldassari | ............ | G06K 17/00 209/583 |
| 2007/0062851 A1* | 3/2007 | Schulz | ..................... | B07C 3/00 209/584 |
| 2007/0156372 A1* | 7/2007 | Christ | .................. | G06Q 10/087 702/158 |
| 2008/0021747 A1* | 1/2008 | Moeller | ............... | G06Q 10/025 705/6 |
| 2008/0264834 A1* | 10/2008 | Olsen | ..................... | B07C 7/005 209/547 |
| 2009/0010741 A1* | 1/2009 | Burgstaller | .......... | B65G 1/1378 414/266 |
| 2011/0046775 A1* | 2/2011 | Bailey | ...................... | B07C 3/02 700/224 |
| 2012/0016709 A1* | 1/2012 | Marchildon | ........... | B07C 3/006 705/7.22 |
| 2012/0101629 A1* | 4/2012 | Olsen | ..................... | B07C 7/005 700/224 |
| 2013/0247519 A1* | 9/2013 | Clark | ......................... | B65B 5/00 53/452 |
| 2014/0148944 A1* | 5/2014 | Bailey | .................... | B65G 33/02 700/224 |
| 2014/0222710 A1* | 8/2014 | Wheelock | ............... | H04W 4/14 705/333 |
| 2015/0151913 A1* | 6/2015 | Wong | ....................... | B07C 9/00 700/214 |
| 2015/0227890 A1* | 8/2015 | Bednarek | .......... | G06Q 30/0635 705/26.81 |
| 2017/0270448 A1* | 9/2017 | Kao | .................. | G06Q 10/06314 |
| 2018/0025315 A1* | 1/2018 | Cortes | ............... | G06Q 30/0635 705/26.81 |
| 2018/0247257 A1* | 8/2018 | Lert, Jr. | ................. | H04W 4/35 |
| 2019/0205829 A1* | 7/2019 | Abebe | ................. | G06K 9/6223 |
| 2019/0255573 A1* | 8/2019 | Chen | ..................... | B07C 5/3412 |
| 2019/0299835 A1* | 10/2019 | Taylor | ................ | G08B 13/19613 |
| 2019/0333130 A1* | 10/2019 | Jha | ....................... | G06F 16/9024 |

\* cited by examiner

DYNAMICALLY GENERATING A SORT ZONE ASSIGNMENT PLAN

BACKGROUND

Customers residing in various geographic regions order items to be shipped to a customer site of choice. As packages containing, for example, pre-packaged customer orders are received at delivery facilities, the packages can be sorted at various locations within the facility prior to delivery to the final delivery destination.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
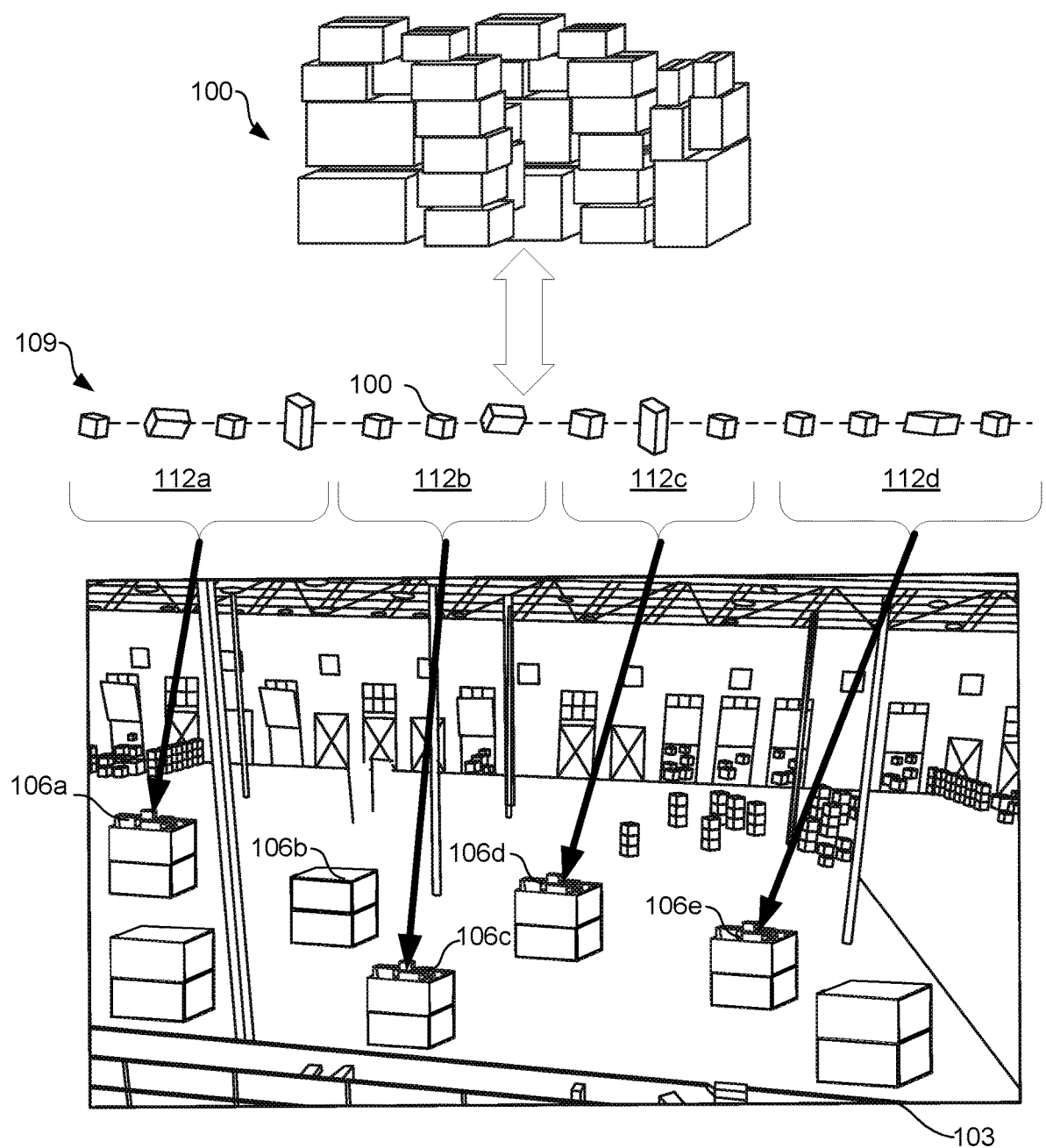
FIG. 1 is a drawing of an example scenario illustrating packages being sorted at a facility according to a dynamically generated sort zone assignment plan in accordance to various embodiments of the present disclosure.

The present disclosure relates to dynamically generating a sort zone assignment plan for sorting items arriving at a facility (e.g., sort center, delivery center, etc.). Specifically, the present disclosure relates to generating a sort zone assignment plan that optimizes sort zone utilization while maintaining tight geographies of final delivery destinations of the packages in order to build efficient routes.

A facility may comprise, for example, a large warehouse or other structure that includes a plurality of sort zones where items such as pre-packaged customer orders can be sorted prior to transfer to a final delivery destination. To this end, a sort zone may comprise, for example, containers, bags, bins, slots, shelves, receptacles, drawers, trays, crates, stalls, cribs, cordoned areas, hooks, racks, or other locations in a storage unit. In some embodiments, a sort zone comprises a single container, for example. In other embodiments, a sort zone may include multiple containers, for example.

Prepared customer packages may be delivered to a facility by carrier vehicles traveling from one or more fulfillment centers, third-party carrier facilities, and/or other areas. Once received, each package can be transported to a particular sort zone within the facility where it can be picked up for delivery to a final delivery destination.

Traditionally, as prepackaged customer orders are received at a facility for last mile delivery, the prepackaged customer orders are transported to predefined sort zones within the facility that correspond to a specific geographic area. For example, a facility may have one hundred different sort zones that are each designated for a predefined geographic region in a city serviced by the facility. A prepackaged customer order that has a final delivery destination within geographic region A will be taken to the sort zone that corresponds to geographic region A.

While this hard-wired static mapping can expedite the sortation process, there is limited room for flexibility and route efficiency. For example, changes in shipment distribution, facility capacity, or jurisdiction necessitates a labor intensive and error-prone "re-zoning" process to redistribute packages to different sort zones. This re-zoning process that can take days to complete, thereby causing delivery delays for packages. While re-zoning can occur periodically based on macro conditions such as jurisdiction changes or major changes in demand patterns, finer adjustments based on shifting daily or weekly volumes is impractical.

Further, the static mapping can result in an unbalanced sort zone utilization when packages arriving for sortation are unevenly distributed among different regions. For example, one sort zone within the facility may receive a large number of packages that exceeds the capacity for the particular sort zone while another sort zone may receive a nominal amount of packages, thereby underutilizing the capacity of the other sort zone. This imbalance can lead to a backup of packages, which can affect route efficiency and ultimately cause delivery delays.

According to various embodiments of the present disclosure, packages received at a facility are assigned to a specific sort zone upon arrival according to a dynamically generated sort zone assignment plan that can change for each sorting cycle (e.g., daily, weekly, etc.). For example, each night a facility may receive packages that are to be sorted for delivery the following day. According to various embodiments of the present disclosure, a sort zone assignment plan can be dynamically generated based at least in part on the specific packages that are expected to arrive at the facility for that night. As such, the amount of sort zones used each night might vary according to the expected packages and the generated sort zone assignment plan.

As one skilled in the art will appreciate in light of this disclosure, certain embodiments may be capable of achieving certain advantages that improve the functioning of computer systems and the functioning of a facility, including some or all of the following: (1) improved flexibility to adjust for fluctuations in demand and unexpected behavior; (2) dynamic ability to adjust in real time based on varied client conditions; (3) dynamic ability to adjust in real time based on varied facility conditions; (4) improved computing efficiencies by, for example, reducing processing demands by reducing assignment options to consider based on certain conditions; (5) improved facility operations; (6) improved route efficiency and delivery operations; and so on.

Figure 2:
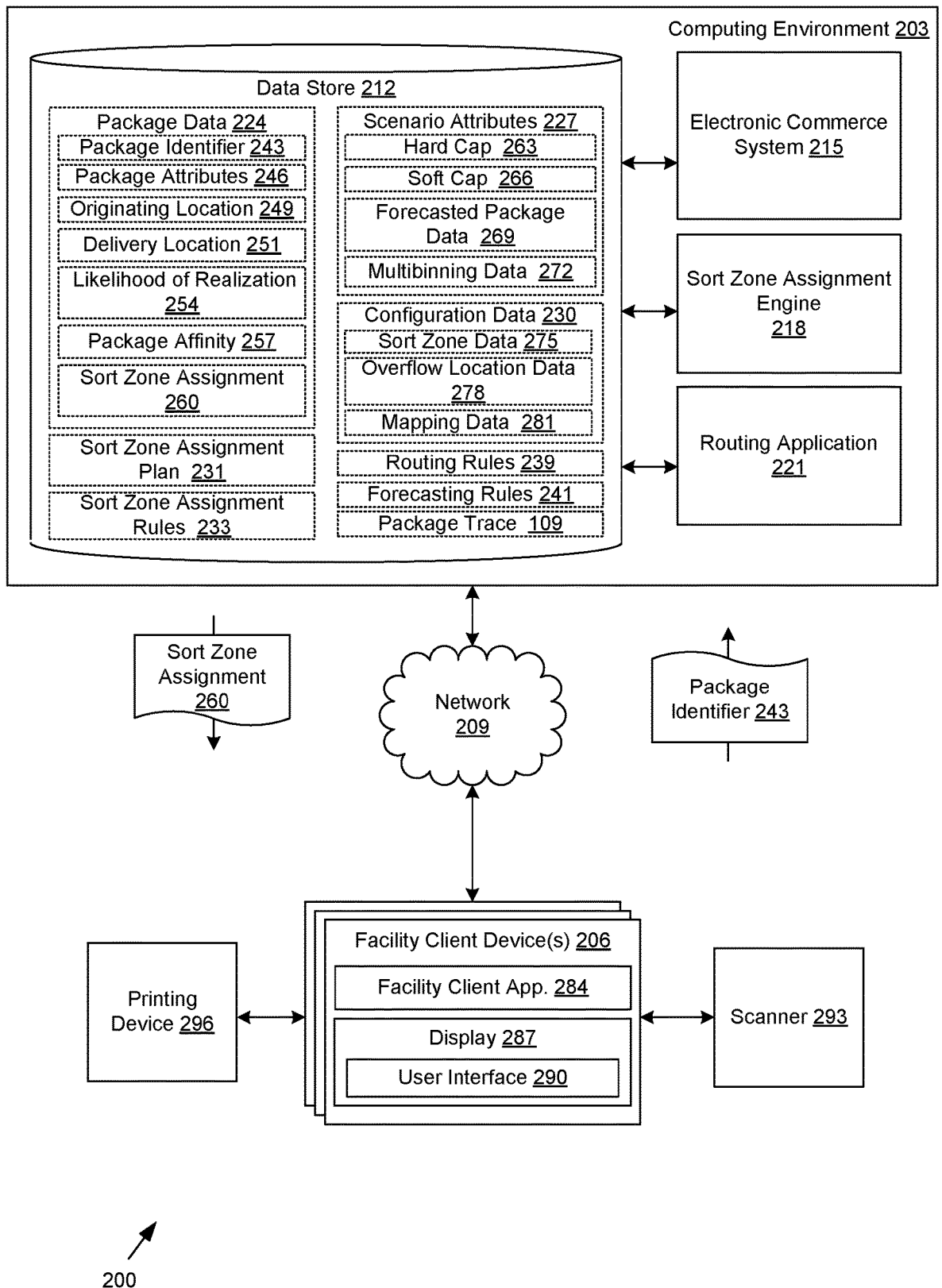
FIG. 2 is a schematic block diagram of a networked environment according to various embodiments of the present disclosure.

FIG. 1 provides an example scenario illustrating packages 100 being sorted at a facility 103 according to a generated sort zone assignment plan. As shown in FIG. 1, the facility 103 comprises a plurality of sort zones 106 (e.g., 106a-106e). According to various embodiments of the present disclosure, packages that are expected to arrive at a facility 103 during a predetermined period of time can be identified based at least in part on manifested and/or predicted orders for items that can be ordered via an electronic commerce system 215 (FIG. 2). For example, item orders can be assigned an estimated delivery date upon realization of the order. Once an item is ordered, the order can be processed through a fulfillment center, for example, where the order can be fulfilled using inventory at the fulfilment center. The order can then be packaged for delivery. The predetermined period of time can correspond to a time range that a facility 103 has to receive and sort packages prior to package pickup by delivery vehicles for final delivery. For example, every night a sort zone assignment plan may be generated for the packages 100 expected to be picked up for delivery the following day.

According to various embodiments, the identification of the packages 100 expected to arrive at a facility 103 during the predetermined period of time can be based at least in part on the estimated delivery date, a location of the fulfillment center in which the order is being fulfilled, whether a package 100 arrived early, and/or other factors. In some embodiments, the expected packages 100 can include orders that have not yet been manifested or placed. For example, aggregate order history and machine learning models can be used to predict whether additional orders for delivery in a particular geographic region that is serviced by the facility 103 are expected to occur during a predetermined period of time. In some embodiments, the forecasted orders are included in the identification of expected packages 100. The ability to predict packages 100 that may arrive at the facility 103 can add value since the sortation process can begin prior to completion of accepting orders for delivery during a particular period of time.

Once the packages 100 that are expected to arrive at the facility 103 are identified, a package trace 109 can be generated. A package trace 109 corresponds to sequence in which the packages 100 can be delivered assuming that all of the packages 100 will be delivered by the same delivery vehicle. The package trace 109 can be generated according to a variety of factors including, for example, a delivery destination location, an affinity between items (e.g., same address, same building, same block, etc.), a delivery time window associated with one or more of the packages 100, and/or any other factors. In some embodiments, the package trace 109 corresponds to individual packages 100. In other embodiments, the package trace 109 corresponds to groups of packages 100.

Once the package trace 109 is generated, the package trace 109 can be partitioned into feasible subsets of consecutive package groups 112 (e.g., 112a-112d) which can be assigned to a particular sort zone 106 (e.g., container, bag, etc.) within the facility 103. Using a variety of factors, a sort zone assignment plan can be generated that is designed to optimize sort utilization while maintaining tight geographies of final delivery destinations for packages 100 having the same sort zone assignment.

The sort zone assignment plan is generated using a cost function that is applied to at least minimize number of sort zones 106 used and minimize overflow. As shown in FIG. 1, the sort zones 106a, 106c, 106d, and 106e are used while 106b, along with other sort zones 106, is not used. The factors for generating the sort zone assignment plan can include, for example, the package trace 109, package data associated with the expected packages 100, configuration data associated with the layouts and capacity configurations for the facility, scenario data including sort zone utilization thresholds, cluster data, bulk prioritization, and/or other factors.

In some embodiments, the sort zone assignment plan includes packages 100 that are oversized and may not fit in a particular sort zone 106. In this situation, the sort zone assignment plan can include an assignment to an overflow location (not shown) that is mapped to particular sort zone 106 such that packages 100 are still placed in an overflow area that is associated with a particular sort zone 106. A package may be determined to be oversized according to package dimensions, package volume, package weight, and/or other factors. For example, one or more predefined package thresholds can be compared to various package properties (e.g., size, volume, weight, etc.) to determine whether a package is to be considered for overflow.

In some embodiments, the sort zones 106 can be organized in a particular order based in part on geographic region, location within the facility 103, a destination of packages, and/or other factors. Arranging the sort zones 103 in a particular order provides for efficiency in downstream routing and delivery vehicle dispatch.

When a package 100 arrives at the facility 103, a package label affixed on the package 100 can be scanned in order to identify the particular package 100. Based on the sort zone assignment plan, the sort zone assignment for the particular package 100 can be determined. According to various embodiments, a label containing the sort zone assignment can be generated, printed, and affixed to the package 100. Once the sort zone assignment is known, the package can be transferred to the assigned sort zone 106. In some embodiments, the package 100 is taken to the sort zone 106 via a worker. In other embodiments, the package 100 is taken to the sort zone 106 via automated machinery (e.g., conveyor, robot, etc.).

Once the packages 100 are placed in the assigned sorting zone 106, routing for the packages and delivery vehicle assignments can be determined with an objective to minimize the number of routes required to deliver the packages 100 within a particular sort zone 106. In some embodiments, a delivery vehicle can transport packages 100 from more than one sort zone 106. In other embodiments, one or more delivery vehicles may be assigned to a single sort zone 106. When the delivery vehicles 115 arrive at the facility 103, the delivery vehicles 115 can be loaded with the packages 100 in at least one sort zone 106 for delivery to a final delivery destination.

In the following discussion, a general description of the system and its components is provided, followed by a discussion of the operation of the same.

With reference to FIG. 2, shown is a networked environment 200 according to various embodiments. The networked environment 200 includes a computing environment 203 and one or more facility client device(s) 206 in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 includes one or more computing devices including at least one processor circuit, for example, having a processor and a memory. Various applications and/or other functionality may be executed in the computing environment 203 according to various embodiments. Also, various data is stored in one or more data stores 212 that are accessible to the computing environment 203.

The components executed on the computing environment 203, for example, include an electronic commerce system 215, a sort zone assignment engine 218, a routing application 221, and other applications, services, processes, systems, engines, or functionality not discussed in detail herein. The electronic commerce system 215 is executed in order to facilitate the online order of items over the network 209 through an electronic marketplace in which one or more sellers participate. The electronic commerce system 215 also performs various backend functions associated with the online presence of a seller in order to facilitate the online order of items. For example, the electronic commerce system 215 may generate network content such as web pages, mobile application data, or other forms of content that are provided to client devices for the purposes of selecting items for purchase, rental, download, lease, or other forms of consumption.

The sort zone assignment engine 218 is executed to dynamically generate the sort zone assignment plan 231 according to various embodiments of the present disclosure. The sort zone assignment engine 218 can identify packages 100 (FIG. 1) that are expected to arrive at a facility 103 (FIG. 1) during a predetermined period of time. In some embodiments, the sort zone assignment engine 218 can identify packages and/or forecast packages 100 over multiple sorting cycles (e.g., multiple days).

The sort zone assignment engine 218 can apply one or more optimization algorithms to determine optimal sort zone assignments for the expected packages 100 based at least in part on a package trace 109 of the expected packages 100, package data 224, scenario attributes 227, configuration data 230, cluster data, bulk prioritization, and/or other data. For example, cluster data can correspond to predefined clusters that are defined according to geographic regions of a delivery area associated with the facility. The sort zone assignment engine 218 can consider the clusters when generating a sort zone assignment plan 231. In particular, packages 100 with a delivery locations associated with different clusters will not be assigned to the same sort zone 106.

Bulk prioritization can be another factor for generating a sort zone assignment plan. For example, packages 100 in bulk packaging may not be assigned a particular sort zone 106. In such situations, if a package 100 is determined to belong in bulk, the package 100 may not be assigned to a particular sort zone 106. Rather, the package 100 can be assigned to a bulk area.

According to various embodiments, the sort zone assignment engine 218 can determine the placement of the various sort zones 106 within the facility 103. The sort zone assignment engine 218 can also determine a particular arrangement of the sort zones 106 based at least in part on geographic region, location within the facility 103, and/or other factors. In some embodiments, the sort zone assignment engine 218 can update sort zone assignments 260 in real-time as needed to account for unexpected packages 100, sort zone utilization limitations, overflow requirements, unexpected transportation delays, and/or other factors.

The routing application 221 is executed to generate routes for packages 100 sorted in a particular sort zone 106 (FIG. 1), sort zones 106, and/or cluster. The routing application 221 is configured to minimize the number of routes required for delivery of the packages 100 given the capacity of delivery vehicles. In some embodiments, the delivery vehicles can vary in size and capacity. The routing application 221 can be configured to account for the different sizes and capacity of the available delivery vehicles when generating the routes for packages 100.

The data stored in the data store 212 includes, for example, package data 224, scenario attributes 227, configuration data 230, sort zone assignment plan 231, sort zone assignment rules 233, package trace 109, routing rules 239, forecasting rules 241, and potentially other data. The package data 224 comprises information relating to the packages 100 expected to be received at the facility 103 during a predetermined period of time. The package data 224 can comprise a package identifier 243, package attributes 246, an originating location 249, a delivery location 251, a likelihood of realization 254, a package affinity 257, a sort zone assignment 260, and/or other data.

The package identifier 243 can comprise an identifier that is unique to the package 100. The package identifier 243 can comprise an alphanumeric code, a barcode, quick response (QR) code, radio frequency identifier (RFID) and/or other type of identifier. The package attributes 246 can comprise a package type (e.g., oversized, standard), package dimensions (e.g., size), a package weight, and/or any other type of attribute.

The originating location 249 can correspond to the location of the package 100 prior to transport to the facility 103. For example, if an order for an item is fulfilled and packaged at a fulfillment center, the originating location 249 will correspond to the location of the fulfillment center. The delivery location 251 can correspond to the final delivery destination for the package 100. The likelihood of realization 254 comprises a data value that relates to the likelihood that the package 100 will actually arrive at the facility 103 during the predefined period of time. The likelihood of realization 254 can be generated using a predictive model that is based on factors that can include, for example, a distance from fulfillment center to facility, historical data, environmental data (e.g., traffic conditions, weather conditions), day of week, date, whether a package 100 has already arrived at the facility 103 (e.g., arrived early), and/or other data. For example, the likelihood of realization 254 can be generated using a sum of weights associated with each of the factors. In some embodiments, the weights vary for each factor.

The package affinity 257 corresponds to the affinity between packages 100 with respect to the final destination delivery location. A package affinity 257 represents a proximity in geographic delivery destinations for different packages 100 such that the greater the package affinity 257 for two packages 100, the closer the final delivery destinations are to one another. For example, the package affinity 257 can be based upon whether two packages are to be delivered to the same unit, same building, same block, etc. The sort zone assignment 260 corresponds to the sort zone 106 assigned to a package 100 according to the sort zone assignment plan 231.

The scenario attributes 227 define parameters and thresholds used by the sort zone assignment engine 218 in generating a sort zone assignment plan 231. The scenario attributes 227 can be dynamic according to historical data, user inputs, and/or other factors. The scenario attributes 227 can include a hard cap 263, a soft cap 266, forecasted package data 269, multibinning data 272, and/or other data. The hard cap 263 corresponds to maximum utilization threshold for a particular sort zone 106. For example, the hard cap 263 can correspond to a maximum percentage of sort zone capacity to be used (e.g., 65% of a 6.7 cubic foot sort zone container). The soft cap 266 corresponds to a target utilization threshold for a particular sort zone 106. For example, the soft cap 266 can correspond to a target utilization of a sort zone capacity (e.g., 55% of a 6.7 cu. ft. container).

The forecast package data 269 can include a forecasted quantity of packages 100 that correspond to orders that have not yet occurred but are expected to occur within a time period for the packages to be delivered to the facility 103 within the predefined period of time. Multibinning data 272 comprises data associated with whether a particular facility 103 allows multibinning. Multibinning occurs when a sort zone 106 comprises multiple containers, bags, bins, pallets, etc. If multibinning is allowed, the additional containers, for example, can be considered by the sort zone assignment engine 218 when generating a sort zone assignment plan 231.

The configuration data 230 comprises data associated with the layout and capacity of the facility 103. The configuration data 230 can include sort zone data 275, overflow location data 278, mapping data 281, and/or other data. The sort zone data 275 can include a number of sort zones 106, a sort zone dimensions (e.g., container size), a sort zone weight, and/or other information. In some embodiments, the sort zone data 275 can include multibinning information, such as, for example, a number of containers in a sort zone 106. The overflow location data 278 can include a number of overflow locations in the facility 103, an overflow location size, and/or other information. The mapping data 281 can include a mapping of sort zones 106 to overflow locations. In some embodiments, there is a one-to-one correspondence between a sort zone 106 and an overflow location. In other embodiments, a sort zone 106 may be mapped to multiple overflow locations. In some embodiments, an overflow location may be mapped to more than one sort zone 106.

The sort zone assignment plan 231 corresponds to the plan generated by the sort zone assignment engine 218 for a given sorting cycle (e.g., day). The sort zone assignment plan 231 assigns the expected packages 100 to a sort zone 106 or an overflow location. The sort zone assignment plan 231 can include a sort zone index that identifies the particular sort zone 106 as well as a list of package identifiers 243 assigned to the sort zone 106. In some embodiments, if the sort zone 106 includes multiple containers, bags, bins, etc., the sort zone assignment plan 231 can further include a bin index to identify which bin, for example, a particular package 100 is assigned to within the sort zone 106. The sort zone assignment plan 231 can further include a listing of overflow locations that can be indexed and mapped to a corresponding sort zone 106. For each overflow location, the sort zone assignment plan 231 can include a listing of package identifiers 243 assigned to the respective overflow location.

The sort zone assignment rules 233 include rules, models, and/or configuration data for the various algorithms or approaches employed by the sort zone assignment engine 218 for determining an optimal sort zone assignment plan 231. For example, the sort zone assignment rules 233 can include the various optimization algorithms and cost functions used by the sort zone assignment engine 218 in generating a sort zone assignment plan 231 that minimizes a number of sort zones 106 and overflow locations used.

The routing rules 239 can include rules and/or configuration data for the various algorithms or approaches employed by the routing application 221 in determining routes for packages 100 assigned to and placed in a particular sort zone 106. For example, the routing rules 239 can include weights that may be assigned to the various factors in determining optimal routes and delivery vehicles for the delivery of the packages 100. The routing rules 239 can further include data associated with a number of delivery vehicles available as well as the capacity limits (e.g., weight limits, volume limits, etc.) for each of the available delivery vehicles.

The forecasting rules 241 can include rules and/or configuration data for the various algorithms or approaches employed by the sort zone assignment engine 218 in forecasting packages 100 that may arrive at the facility 103 but are not scheduled to arrive during the predetermined period of time. The forecasted packages 100 can include packages 100 that will arrive early from a fulfillment center, packages 100 associated with predicted orders that have not yet manifested, and/or other types of packages 100.

The facility client device 206 is representative of a plurality of client devices that may be coupled to the network 209. The facility client device 206 may comprise, for example, a processor-based system such as a computer system comprising a processor circuit, such as one that includes a processor and a memory. The facility client device 206 can further be in data communication with a scanner 293, a printing device 296, and/or other peripheral devices.

The facility client device 206 may be configured to execute various applications such as a facility client application 284 and/or other applications. The facility client application 284 may be executed in a facility client device 206, for example, to access network content served up by the computing environment 203 and/or other servers. For example, the facility client application 284 can be executed to generate sort zone assignment requests to send to the sort zone assignment engine 218 requesting a sort zone assignment 260 for a particular package 100. A sort zone assignment request can include a package identifier 243, which can be used for identifying the particular package 100. For example, the facility client application 284 can determine a package identifier 243 for a package 100 via an image on the package 100 obtained from a scanner 293. In some embodiments, the facility client application 284 can be configured to generate an assignment label comprising the sort zone assignment 260. The facility client application 284 can instruct a printing device 296 to print the assignment label.

In some embodiments, the facility client application 284 can cause a user interface 290 to be rendered on a display 287. To this end, the client application 284 may comprise, for example, a browser, a dedicated application, etc., and the user interface 290 may comprise a network page, an application screen, etc. According to various embodiments, a user can interact with the facility client application 284 via the user interface 290 to provide inputs associated with the generation of a sort zone assignment plan 231. For example, a user can provide inputs with parameters associated with sort zone capacity, scenario attributes, delivery vehicle availability, worker availability, etc. In some embodiments, a user can initiate a start of the sort zone assignment process via an input to the sort zone assignment engine 218. For example, upon receiving an input requesting the sort zone assignment process to begin, the facility client application 284 can send a request to the sort zone assignment engine 218 to begin generation of the sort zone assignment plan 231. In other embodiments, the sort zone assignment engine 218 can begin generating the sort zone assignment plan 231 automatically based at least in part on a predefined period of time (e.g., 9 pm every night).

It should be noted that although the sort zone assignment engine 218 and routing application 221 are shown in FIG. 2 as being executable in the computing environment 203, the sort zone assignment engine 218 and/or routing application 221 can be local to the facility client device 206. As such, in some embodiments, the facility client device 206 is configured to execute the sort zone assignment engine 218 and/or routing application 221. In addition, the data associated with the execution of these applications can be accessed remotely via the data store 212 in the computing environment 203 and/or locally via a local data store in the facility client device 206.

Next, a general description of the operation of the various components of the networked environment 200 is provided. As previously discussed, the sort zone assignment engine 218 can identify packages 100 expected to arrive at a facility 103 during a predefined period of time for sortation and transport to delivery vehicles for final delivery. Once the sort zone assignment engine 218 identifies the expected packages 100, a package trace 109 can be generated. The package trace 109 corresponds to a sequence in which the packages 100 can be delivered assuming that all of the packages 100 will be delivered by the same delivery vehicle. For example, the package trace 109 may be generated by determining a route of delivery for delivering all of the packages 100. The first package 100 in the package trace 109 can correspond to the first package 100 to be delivered while the last package 100 in the package trace 109 can correspond to the last package 100 to be delivered. The package trace 109 is generated with consideration for both standard and oversized packages 100.

Figure 3:
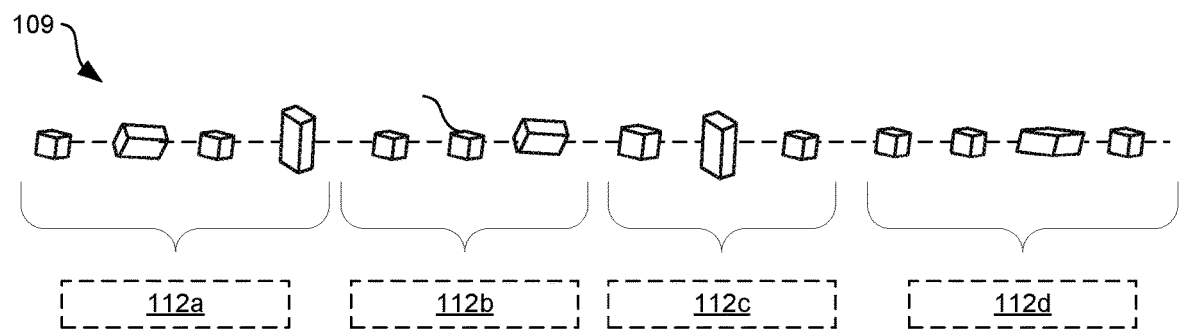
FIG. 3 illustrates an example of a diagram illustrating a package trace being partitioned into consecutive package groups according to various embodiments of the present disclosure.

Following generation of the package trace 109, the sort zone assignment engine 218 can partition the package trace 109 into sections comprising consecutive package groups 112 (FIG. 1) that are selected such that each package group 112 does not exceed the capacity limits of a sort zone 106. FIG. 3 illustrates an example of a diagram illustrating a package trace 109 of packages 100 partitioned into consecutive package groups 112 (e.g., 112a-112d) according to various embodiments of the present disclosure.

Figure 4:
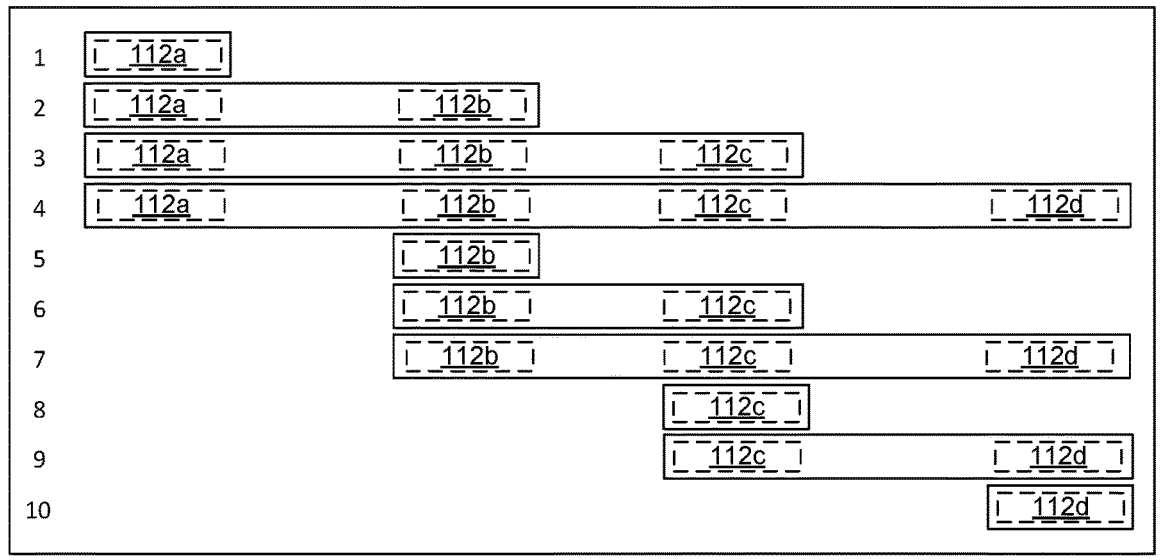
FIG. 4 illustrates an example of a diagram illustrating sort zone assignment options for the consecutive package groups of FIG. 3 according to various embodiments of the present disclosure.

Turning now to FIG. 4, shown is an example diagram illustrating the different options available for sort zone assignments 260 (FIG. 2) for each of the consecutive package groups 112 created in the example scenario of FIG. 3. According to various embodiments, the sort zone assignment engine 218 (FIG. 2) can analyze each of the different options (e.g. 1-10) to determine an optimal placement that minimizes sort zone utilization and minimizes overflow.

For example, in some embodiments, the sort zone assignment engine 218 can analyze each of the different options. Using a cost function, the sort zone assignment engine 218 can determine which combination of options minimizes the overall cost. For example, in FIG. 4, the sort zone assignment engine 218 could choose options 1, 6, and 10 to cover all of the package groups 112.

According to various embodiments, the sort zone assignment engine 218 can generate the sort zone assignment plan 231 with the objective to minimize:

$$\sum_{\forall i} C_i * X_i + \sum_{\forall j} N * U_j + \sum_{\forall j} M * O_j + \sum_{\forall i,k} T_{ik} * y_{ik} + \sum_{\forall i} S * B_k$$

where for the assignment of route zone sort zones $\Sigma_i a_{ij} * X_i + U_j - O_j = 1$, for every route zone j; the maximum number of sort zones $\Sigma_i X_i \leq MAX_{SZ}$; the assignment of oversized packages $\Sigma_k Y_{ik} = 1$, for every oversized package i, and the capacity of oversize containers $\Sigma_i V_k Y_{ik} - B_k \leq$ MaxOversize-BinCapacity, for every oversize container k.

The variables and parameters for the above function are as follows:

| Variables | |
|---|---|
| $X_i$ | $\begin{cases} 1, & \text{if candidate sort zone i is selected} \\ 0, & \text{otherwise} \end{cases}$ |
| $Y_{ik}$ | $\begin{cases} 1, & \text{if oversized package i is assigned to oversize container k} \\ 0, & \text{otherwise} \end{cases}$ |
| $O_j$ | Over coverage of route zone j |
| $U_j$ | Under coverage of rout zone j |
| $B_k$ | Over utilization of oversize container k |

| Parameters | |
|---|---|
| $a_{ij}$ | $\begin{cases} 1, & \text{if candidate sort zone i includes route zone j} \\ 0, & \text{otherwise} \end{cases}$ |
| $C_i$ | Cost of candidate sort zone. |
| M | Penalty cost for over coverage |
| N | Penalty cost for under coverage |
| S | Penalty cost for over utilization of oversize containers |
| $T_{ik}$ | Penalty cost for assigning oversize package i to oversize container k. |
| MAX_SZ | Max number of sort zones |
| MaxOversizeBinCapacity | Max cube of each oversize container |
| $V_k$ | Volume of oversize package k |

In the example of FIGS. 3 and 4, all of the different combinations of package groups 112 are shown. However, in reality, there may be hundreds of package groups 112 and generating all of the options may not be practical. Some of those options would lead to fewer sort zones 106 used but result in greater multibinning or overflow or poor distribution of utilization across the sort zones 106. According to various embodiments, assignment options can be selected in a more controlled fashion based on what would result in a higher quality solution. Further, by reducing the amount of options that are analyzed, the amount of computing resources (e.g., CPU, memory, network, etc.) used are reduced thereby creating a technical improvement to the overall system. The cost function is designed to drive the selection of the options that have more desirable characteristics.

To control the introduction of different options, the sort zone assignment engine 218 can use a staged options generation strategy. In this approach, options are generated in different stages where each stage defines a range of sort zone utilization such that there are progressively higher levels of utilization. For example, the different ranges applied could include the following:

1) [0.0, Hard Cap]
2) (Hard Cap, 125%*Hard Cap]
3) (125%*Hard Cap, 200%*Hard Cap]

4) (200%*Hard Cap, 300%*Hard Cap]
5) (300%*Hard Cap, 400%*Hard Cap]
6) (400%*Hard Cap, 1000%*Hard Cap]

Figure 5:
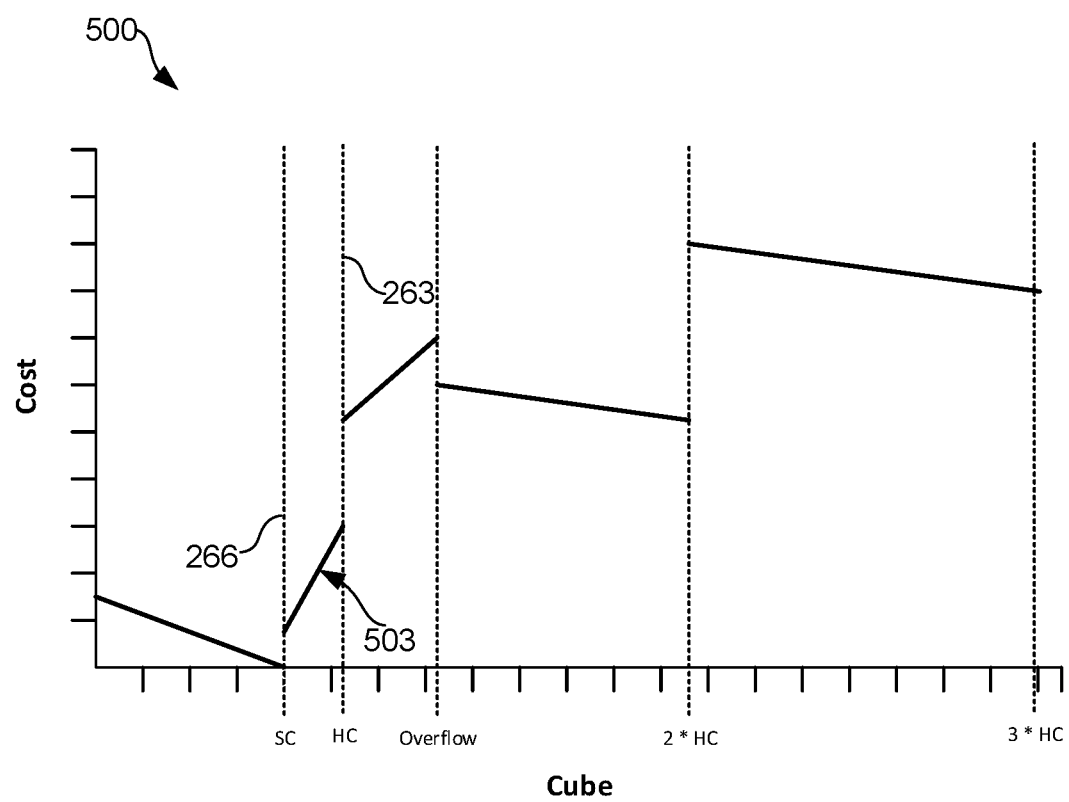
FIG. 5 illustrates an example of a graphical representation of a cost function associated with utilization of a sort zone according to various embodiments of the present disclosure.

Turning now to FIG. 5, shown is an example graph 500 illustrating a cost function applied by the sort zone assignment engine 218 (FIG. 2) in selecting the optimal options for a sort zone assignment plan 231 according to various embodiments. The cost function can be structured to encourage or discourage the use of a particular option in comparison with other options. FIG. 5 illustrates a piece-wise cost function that drives the solution towards options that are close to but still less than the soft cap 266 in sort zone utilization. The increasing function 503 between soft cap 266 and hard cap 263 shows the increasing cost as the utilization approaches the hard cap 263. Above the hard cap 263, the cost jumps and increases as it approaches the overflow limit since in this range, package(s) 100 will need to be directed towards the overflow location. When the overflow limit is exceeded, double binning is required.

When determining the number of sort zones 106 that will be included in the sort zone assignment plan 231 for a given sorting cycle, the sort zone assignment engine 218 can balance a desire to reduce package overflow while avoiding under-utilized bags. While there is value in not utilizing a large quantity of sort zones 103 on a low volume day, the sort zone assignment plan 231 is designed to also minimize the amount of overflow. According to various embodiments, the sort zone assignment engine 218 generates a sort zone assignment plan 231 that minimizes a number of sort zones 106 and minimizes overflow.

In one non-limiting example, the sort zone assignment engine 218 generates a sort zone assignment plan 231 according to a minimum sort zone utilization threshold. This approach would minimize the likely overflow given the utilization limit. For example, if all sort zones 106 are required to be at least 25% full, the total number of sort zones 106 used becomes min (Station Cube/(Hard Cap*25%, Max Sort Locations).

In another non-limiting example, the sort zone assignment engine 218 can generate a sort zone assignment plan 231 according to a predefined buffer threshold. For example, if the buffer threshold is set to 5%, the number of sort zones 106 used can be based in part on min (Station Cube/(Hard Cap*95%), Max Sort Locations).

In another non-limiting example, the sort zone assignment engine 218 can generate a sort zone assignment plan 231 that minimizes a quantity of sort zones 103 used and minimizes overflow based at least in part on an overflow target threshold. For example, if a target overflow is set at 3% and a 1% overflow has been observed in previous package 100 to sort zone 106 distributions, a 2% overflow could be allocated to a virtual overflow. If the virtual overflow indicates that there is a 2% chance of an underestimation of the cube by 0.5 cubic feet, the sort zone assignment engine 218 can minimize the number of sort zones 106 and overflow based in part on min (Station Cube/(Hard Cap−0.5), Max Sort Locations).

Referring next to FIGS. 6-10, shown are flowcharts that provide examples of the operation of portions of the sort zone assignment engine 218 (FIG. 2), routing application 221 (FIG. 2), and facility client application 284 (FIG. 2) according to various embodiments. It is understood that the flowcharts of FIGS. 6-10 provide merely examples of the many different types of functional arrangements that may be employed to implement the operation of different applications as described herein. As an alternative, the flowcharts of FIGS. 6-10 may be viewed as depicting examples of elements of methods implemented in the computing environment 203 (FIG. 2) or facility client device 206 (FIG. 2) according to one or more embodiments.

Figure 6:
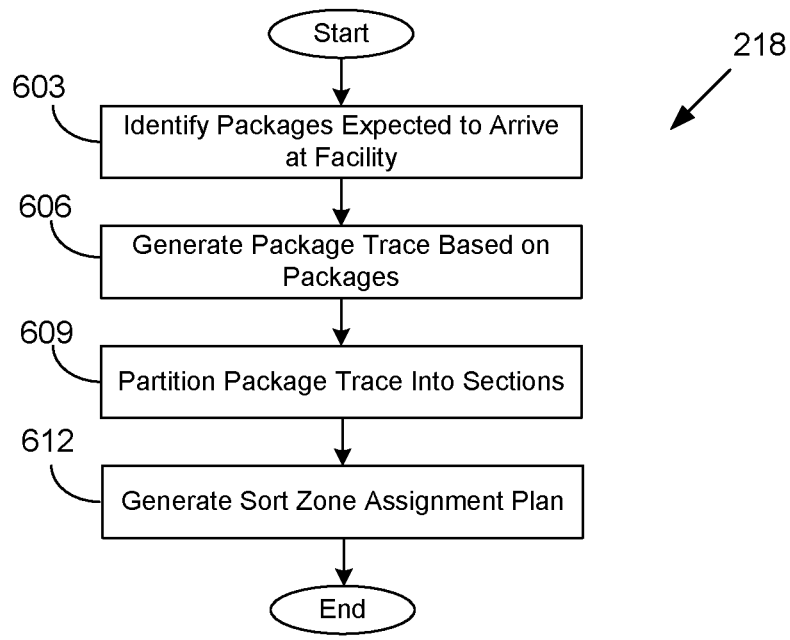
FIGS. 6-8 are flowcharts illustrating examples of functionality implemented as portions of the sort zone assignment engine executed in a computing environment in the networked environment of FIG. 2 according to various embodiments of the present disclosure.

In FIG. 6 shown is a flowchart that provides an example of the operation of a portion of the sort zone assignment engine 218 according to various embodiments. Beginning with box 603, the sort zone assignment engine 218 identifies packages 100 (FIG. 1) expected to arrive at a facility 103 (FIG. 1) during a predetermined period of time. According to various embodiments of the present disclosure, items that are expected to arrive at the facility 103 can be identified based at least in part on manifested and predicted orders for items that can be ordered via an electronic commerce system 215 (FIG. 2). In some embodiments, the packages 100 can be identified according to the fulfillment centers in which the orders are to be fulfilled and/or packaged. In some embodiments, the sort zone assignment engine 218 can predict additional packages 100 associated with orders that have not yet been realized. In some embodiments, the package identifiers 243 (FIG. 2) are known because they are associated with a manifested order. In other embodiments, the package identifiers 243 are unknown at the time of identifying the expected packages because the orders associated with the packages are unknown.

In box 606, the sort zone assignment engine 218 generates a package trace 109 (FIG. 1) corresponding to the identified expected packages 100. The package trace 109 corresponds to a routing plan and a sequence of delivery for the packages 100 under an assumption that the packages 100 will be delivered by the same delivery vehicle along the same route. The package trace 109 can be generated according to a variety of factors including, for example, a delivery destination location, an affinity between items (e.g., same address, same building, same block, etc.), a delivery time window guaranteed for any one of the packages, and/or any other factors.

In box 609, the sort zone assignment engine 218 partitions the package trace 109 into feasible subsets of consecutive package groups 112 (FIG. 1) that could be assigned to a sort zone 106 (FIG. 1). According to various embodiments, the package trace 109 is partitioned to create consecutive package groups 112 with an objective to minimize the total sort zones 106 that will be needed to operate during a particular sorting cycle. The package groups 112 can be determined based at least in part on a package affinity, a sort zone capacity, a sort zone weight limit, a delivery time, and/or other factors.

In box 612, the sort zone assignment engine 218 generates the sort zone assignment plan 231. The sort zone assignment plan 231 includes the sort zone index and the package identifier 243 for each package 100 assigned to a particular sort zone 106. In some embodiments, a package 100 can be assigned to an overflow location instead of a sort zone 106. For example, if a particular package 100 is oversized and will not meet the size and/or weight requirements of a particular sort zone 106, the package can be assigned to an overflow location that is associated with the particular sort zone 106. According to various embodiments of the present disclosure, the sort zone assignment plan 231 is generated by determining a plurality of sort zone placement options for each of the package trace subsets. The sort zone assignment engine 218 can then use a cost function to determine which combination of options minimizes the overall cost. Once the sort zone assignment engine 218 generates the sort zone assignment plan 231 in order to minimize cost, this portion of the sort zone assignment engine 218 ends.

Figure 7:
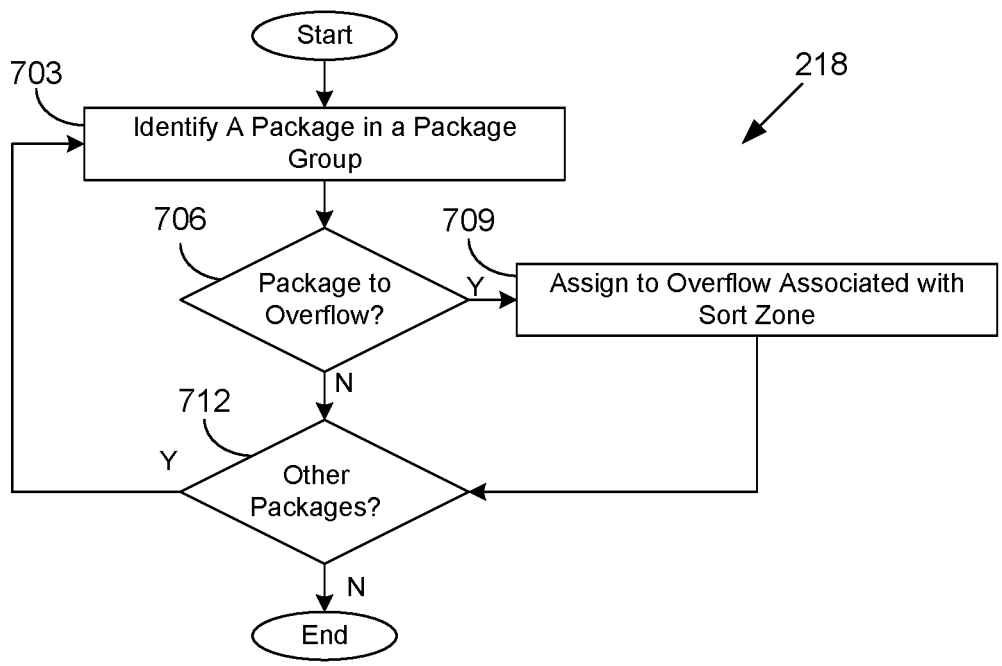

Referring next to FIG. 7, shown is a flowchart that provides one example of the operation of a portion of the sort zone assignment engine 218 according to various embodiments. FIG. 7 relates to situations where packages 100 included in a package group 112 (FIG. 1) are oversized and exceed the capacity limits of a sort zone 106 (FIG. 1).

Beginning with box 703, the sort zone assignment engine 218 can identify a particular package 100 assigned to a package group 112. The package 100 can be identified based on a location within the package trace 109 (FIG. 1), a size, randomly, and/or other factor. Once a package 100 is identified, the sort zone assignment engine 218 proceeds to box 706.

At box 706, the sort zone assignment engine 218 determines whether the package 100 should be assigned to overflow. A package 100 should be placed in overflow if the package 100 exceeds the capacity requirements for a sort zone 106. For example, if the dimensions of the package 100 and/or a weight of the package 100 exceed the capacity requirements for a sort zone 106, the sort zone assignment engine 218 can determine to assign the package 100 to an overflow location. In some embodiments, a package 100 may be determined to be oversized according to package dimensions, package volume, package weight, and/or other factors. For example, one or more predefined package thresholds can be compared to various package properties (e.g., size, volume, weight, etc.) to determine whether a package 100 is to be considered for overflow. If the package 100 is to be assigned to overflow, the sort zone assignment engine 218 proceeds to box 709. Otherwise, the sort zone assignment engine 218 proceeds to box 712.

At box 709, the sort zone assignment engine 218 assigns the package 100 to an overflow location associated with the sort zone 106 assigned to the package group 112. At box 712, the sort zone assignment engine 218 determines if there are other packages 100 in the package group 112. If there are other packages 100 in the package group 112, the sort zone assignment engine 218 proceeds to box 703. Otherwise, this portion of the sort zone assignment engine 218 ends.

Figure 8:
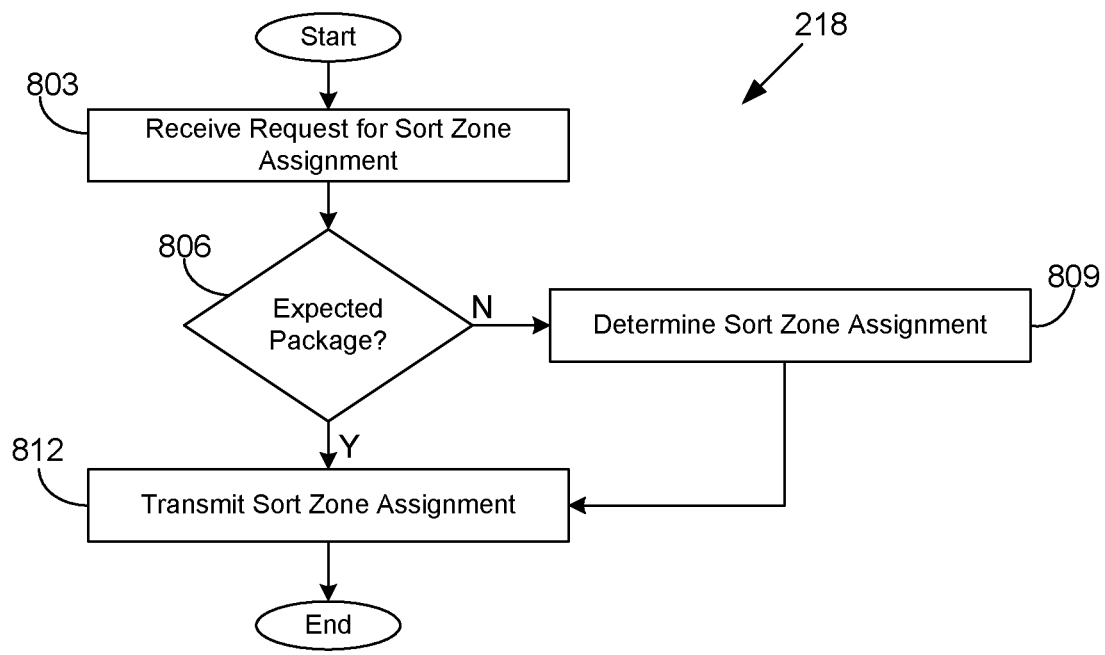

Referring next to FIG. 8, shown is a flowchart that provides one example of the operation of a portion of the sort zone assignment engine 218 according to various embodiments. To begin, in box 803, the sort zone assignment engine 218 receives a request for a sort zone assignment 260 (FIG. 2) from a facility client device 206. The sort zone assignment request can include a package identifier 243 (FIG. 2), which can be used for identifying the particular package 100 (FIG. 1). The package identifier 243 can comprise an identifier that is unique to the package 100. The package identifier 243 can comprise an alphanumeric code, a barcode, quick response (QR) code, radio frequency identifier (RFID) and/or other type of identifier. According to various embodiments, the package identifier 243 is obtained via a scan of a label on a package 100 received at a facility 103 (FIG. 1).

In box 806, the sort zone assignment engine 218 determines whether the package 100 was expected. If the package identifier 243 fails to match any of the package identifiers 243 assigned to sort zones 106, the package 100 is determined to be unexpected. For example, if the package 100 arrived early and/or the actual package was not included in the package trace 109, the package 100 can be determined to be unexpected. If the package 100 is unexpected, the sort zone assignment engine 218 proceeds to box 809. Otherwise, the sort zone assignment engine 218 proceeds to box 812.

In box 809, the sort zone assignment engine 218 determines the sort zone 106 placement for the unexpected package 100. The sort zone assignments 260 can be based at least in part on a delivery destination location associated with the unexpected package 100. For example, the delivery destination location associated with the unexpected package 100 can be compared with other delivery destination locations for the expected packages 100. The unexpected package 100 can be assigned to the same sort zone 106 as a package 100 determined to have the closest delivery location as the unexpected package 100. Since the sort zone assignment engine 218 accounted for unexpected packages 100, the sorting process can remain undisturbed.

In box 812, the sort zone assignment engine 218 transmits the sort zone assignment 260 to the facility client device 206. Once the sort zone assignment is received at the facility 103, the package 100 can be transported to the assigned sort zone 106. After transmitting the sort zone assignment 260, this portion of the sort zone assignment engine 218 ends.

Figure 9:
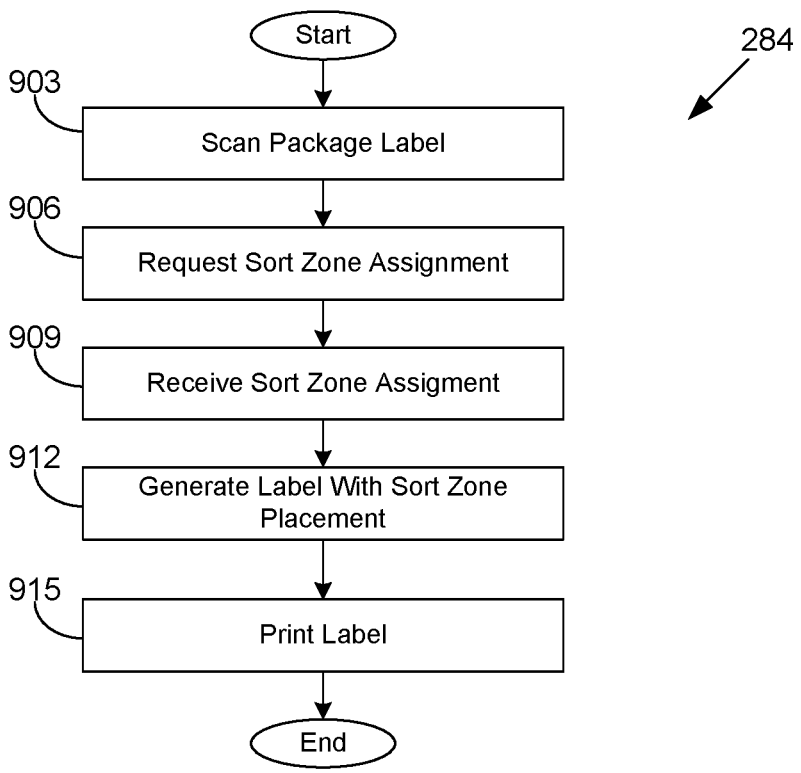
FIG. 9 is a flowchart illustrating an example of functionality implemented as portions of a facility client application executed in a facility client device in the networked environment of FIG. 2 according to various embodiments of the present disclosure.

Referring next to FIG. 9, shown is a flowchart that provides one example of the operation of a portion of the facility client application 284 according to various embodiments. Beginning with box 903, the facility client application 284 scans a package label received at a facility 103 (FIG. 1). For example, the facility client application 284 can instruct the scanner 293 (FIG. 2) to scan a package label to obtain a package identifier 243 (FIG. 2) for the package 100 (FIG. 1). In some embodiments, the facility client application 284 sends an instruction to the scanner 293 to scan the package 100 in response to a user input. In other embodiments, the facility client application 284 sends an instruction to the scanner 293 in response to an automated detection of the package 100 via one or more sensors on a client device 206.

In box 906, the facility client application 284 sends a request to the sort zone assignment engine 218 (FIG. 2) requesting the sort zone assignment 260 (FIG. 2) for the particular sort zone 106. The request includes the package identifier 243 extracted from the scanned package label. In box 909, the facility client application 284, receives the sort zone assignment 260 from the sort zone assignment engine 218.

In box 912, the facility client application 284 generates a label containing the sort zone assignment 260. In some embodiments, the facility client application 284 can generate a user interface comprising the sort zone assignment 260 that can be rendered on the display 287 (FIG. 2) of the facility client device 206.

In box 915, the facility client application 284 prints the label containing the sort zone assignment 260 via the printing device 296 (FIG. 2) in data communication with the facility client device 206. After the label is printed, the package 100 can be transported to the assigned sort zone 106 via a worker and/or automated machinery.

Figure 10:
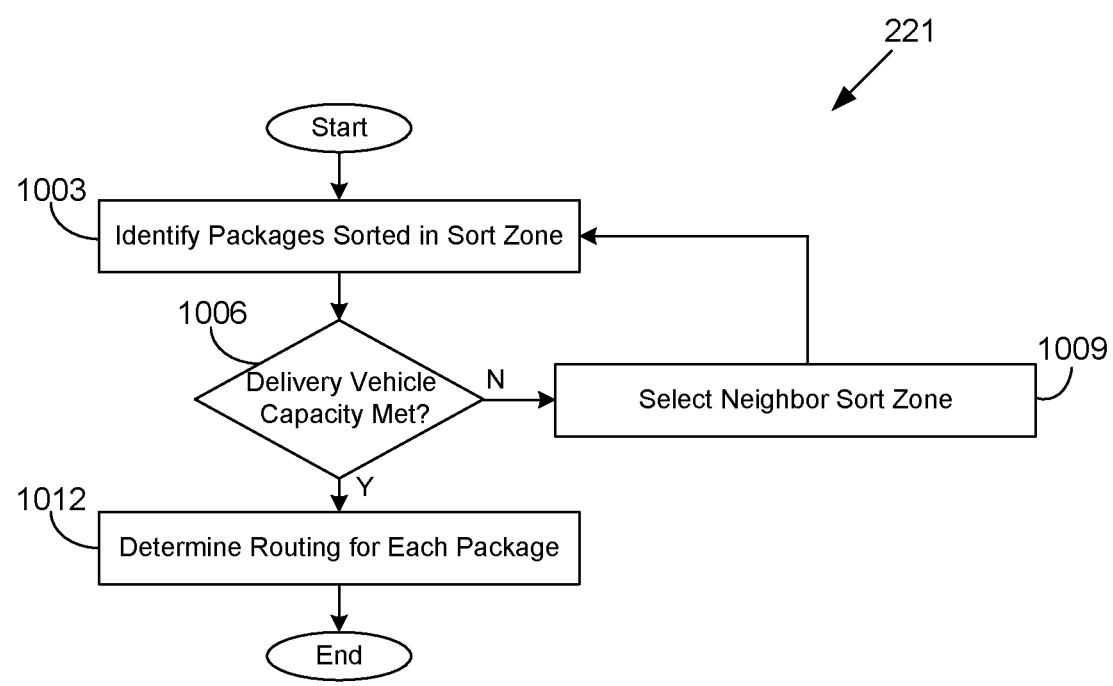
FIG. 10 is a flowchart illustrating an example of functionality implemented as portions of a routing application executed in a computing environment in the networked environment of FIG. 2 according to various embodiments of the present disclosure.

Referring next to FIG. 10, shown is a flowchart that provides one example of the operation of a portion of the routing application 221 according to various embodiments. To begin, in box 1003, the routing application 221 identifies packages 100 (FIG. 1) sorted to a particular sort zone 106 (FIG. 1). For example, the packages 100 sorted in a particular sort zone 106 can be identified by a tracking of the packages 100 scanned upon being received at the facility 103 (FIG. 1) and/or a tracking of the packages 100 scanned when placed in a sort zone 106. Although the sort zone assignment plan 231 includes a listing of packages 100 that are assigned to a particular sort zone 106, not all of the packages 100 will actually arrive, and/or unexpected packages 100 will be received. Therefore, routing occurs upon completion of sortation process of the packages 100 during the predetermined period of time.

Upon identifying the packages 100 in a sort zone 106, the routing application 221 proceeds to box 1006. In box 1006, the routing application determines whether the amount of packages are within a delivery capacity threshold for the assigned delivery vehicles. For example, assume a sort zone includes 100 packages that take up 55% of the cube of the sort zone 106 and that a delivery vehicle has the capacity of two sort zones, the routing application 221 can determine that the delivery capacity is not met. However, if the delivery capacity threshold is 80% of the utilization of the delivery vehicle and the packages 100 within a sort zone 106 and corresponding overflow location exceed a minimum capacity threshold, the routing application 221 can determine that the delivery vehicle capacity is met. If the routing application 221 determines that the delivery capacity is met, the routing application 221 proceeds to box 1012. Otherwise, the routing application 221 proceeds to box 1009.

In box 1009, the routing application 221 identifies a neighboring sort zone 106 with packages 100 that could be added to the original sort zone 106 in order to optimize the delivery vehicle capacity. In box 1012, the routing application 221 determines routing for each package 100 in the sort zone 106 (and neighboring sort zone, if applicable). The routing is based on a plurality of factors such as delivery destination, package affinity 257 (FIG. 2), time window for delivery (e.g., office hours, scheduled delivery within set time window, etc.), delivery vehicle availability, delivery vehicle capacity, and/or other factors. The routing application 221 generates the routing for each package 100 with the objective to minimize the number of routes required. Upon generating the routing for the packages 100, this portion of the routing application 221 ends.

Next, a discussion of the technical devices of the computing environment 203 and a facility client device(s) 206 is provided. Stored in memory are both data and several components that are executable by processor. Also stored in the memory can be a data store 212 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the electronic commerce system 215, sort zone assignment engine 218, routing application 221, facility client application 284 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function (s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should Therefore, the following is claimed:

1. A system, comprising:
    a robot configured to transfer a plurality of packages to a plurality of sort zones in a facility;
    at least one computing device; and
    at least one application executable on the at least one computing device, wherein when executed, the at least one application causes the at least one computing device to at least:
        identify the plurality of packages expected to arrive at the facility from a plurality of different fulfillment centers during a predetermined period of time based at least in part on a plurality of orders received via an electronic commerce system;
        generate a package trace for the plurality of packages based at least in part on a respective delivery destination, the package trace corresponding to a sequence in which the plurality of packages can be delivered;
        partition the package trace into a plurality of package groups, individual package groups comprising a respective consecutive subset of the plurality of packages;
        assign the individual package groups to a respective sort zone from the plurality of sort zones based at least in part on the package trace, package data associated with the plurality of packages, a facility configuration, and at least one sort zone utilization threshold;
        receive a request from a client device for a sort zone assignment for a particular package, the request including a scan of a package identifier located on the particular package; and
        transmit the sort zone assignment to the client device, the client device comprising a printer configured to print a label comprising the sort zone assignment,
    wherein the robot transfers the particular package to the respective sort zone based at least in part on the sort zone assignment on the label.

2. The system of claim 1, wherein assigning the individual package groups to the respective sort zones within the facility further comprises applying a cost function to minimize a number of sort zones used in the facility and minimize overflow of packages in any one of the plurality of sort zones.

3. The system of claim 1, wherein a first package of the plurality of packages corresponds to a realized order via the electronic commerce system and a second package of the plurality of packages corresponds to a predicted future order.

4. The system of claim 1, wherein the package data comprises a respective likelihood of realization for individual packages of the plurality of packages, and when executed, the at least one application further causes the at least one computing device to at least generate the respective likelihood of realization based at least in part on at least one of: a distance from a fulfillment center to the facility, historical data, environmental data, a day of week, a time of day, whether a respective package has already arrived at the facility, or an aggregate purchase history for a particular geographic region associated with the facility.

5. A method, comprising:
    determining, via at least one computing device, a package trace for a plurality of packages expected to arrive at a facility during a predefined period of time;
    generating, via the at least one computing device, a sort zone assignment plan based at least in part on the package trace, the sort zone assignment plan corresponding to an optimized distribution of the plurality of packages to a plurality of sort zones within the facility, and the sort zone assignment plan being generated with flexibility for at least one of: an unexpected package or an oversized package;
    assigning, via the at least one computing device, individual packages of the plurality of packages a respective sort zone assignment based at least in part on the sort zone assignment plan;
    scanning, via a scanner device in data communication with the at least one computing device, a package label affixed to a particular package received at the facility;
    printing, via a printing device in data communication with the at least one computing device, an assignment label generated in an instance in which the respective sort zone assignment is determined according to the package label; and
    transferring, via an automated machinery, the particular package to an assigned sort zone within the facility based at least in part on the respective sort zone assignment on the assignment label.

6. The method of claim 5, wherein the sort zone assignment plan is further based at least in part on at least one of: package data, facility configuration data, or at least one sort zone utilization threshold.

7. The method of claim 6, wherein the package data for the individual packages of the plurality of packages comprises at least one of: a package weight, a package type, a package size, a package address, a likelihood of a respective package arriving at the facility during the predetermined period of time, or a respective delivery proximity with a neighboring package in the package trace.

8. The method of claim 6, wherein the facility configuration data comprises at least one of: a number of sort zones in the facility, a maximum weight capacity of individual sort zones, a maximum size of the individual sort zones, a number of overflow containers, a mapping of the plurality of sort zones to a plurality of overflow containers.

9. The method of claim 6, wherein the at least one sort zone utilization threshold comprises at least one of a maximum utilization percentage of a sort zone capacity or a target utilization percentage of the sort zone capacity.

10. The method of claim 5, further comprising:
    partitioning the package trace into a plurality of consecutive subsets of the plurality of packages;
    determining, via the at least one computing device, a plurality of placement options for assigning individual consecutive subsets to the plurality of sort zones in the facility; and
    determining, via the at least one computing device, an optimal subset of the plurality of placement options via an application of a cost function designed to minimize a number of sort zones used.

11. The method of claim 5, further comprising determining, via the at least one computing device, an arrangement of the plurality of sort zones within the facility for a particular sorting cycle.

12. The method of claim 5, further comprising determining, via the at least one computing device, a route for the individual packages being assigned to a same sort zone and actually transferred to the same sort zone.

13. The method of claim 5, wherein the automated machinery comprises a robot or an automated conveyer.

14. A system, comprising:
an automated transfer device for automatically transferring a plurality of items to a plurality of placement areas in a facility;
at least one computing device; and
at least one application executable in the at least one computing device, wherein when executed the at least one application causes the at least one computing device to at least:
determine the plurality of items expected to arrive at the facility during a predetermined period of time, the plurality of items being identified including at least one realized order via an electronic commerce system and at least one future order;
generate a placement area plan that minimizes a number of placement areas within the facility to be used for placement of the plurality of items, the placement area plan being generated based at least in part on at least one of: item data, configuration data, or at least one sort zone utilization threshold, and the placement area plan being generated with a flexibility for at least one of: an unexpected item or an oversized item;
assign a respective placement area of the plurality of placement areas within the facility to individual items of the plurality of items based at least in part on the placement area plan; and
initiate a transfer of a respective item to a respective assigned placement area in response to determining that the respective item has been received at the facility, the respective item being transferred to the respective assigned placement area via the automated transfer device.

15. The system of claim 14, wherein the system comprises a scanning device and a printing device in data communication with the at least one computing device, and
the scanning device is configured to at least:
scan a label affixed on a particular item received at the facility; and
the at least one computing device is further configured to at least:
determine a placement area assignment for the particular item based at least in part on a package identifier received from scanning the label;
generate an assignment label based at least in part on the placement area assignment associated with the package identifier; and
initiate printing of the assignment label via the printing device.

16. The system of claim 14, wherein, when executed, the at least one application further causes the at least one computing device to at least:
receive a request for a placement area assignment for a particular item, the request comprising an item identifier;
determine that the particular item is unexpected;
identify at least one item of the plurality of items that is similar to the particular item; and
assign the particular item to a same placement area of the at least one item.

17. The system of claim 14, wherein generating the placement area plan further comprises:
creating a plurality of item groups based at least in part on a respective destination delivery for individual items of the plurality of items, individual item groups comprising a respective subset of the plurality of items; and
applying a cost function that minimizes a number of placement areas assigned to the plurality of items and minimizes overflow.

18. The system of claim 14, wherein the configuration data comprises at least one of a number of placement areas in the facility, a maximum weight capacity of a placement area, a maximum dimensions of the placement area, a number of overflow containers, a mapping of the plurality of placement areas to a plurality of overflow containers.

19. The system of claim 14, wherein the item data comprises at least one of an item weight, an item type, an item size, an item address, a likelihood of a respective package arriving during the predetermined period of time, a respective delivery proximity with a neighboring item in a package trace.

20. The system of claim 14, wherein the automated transfer device comprises a robot or an automated conveyer.

* * * * *